United States Patent [19]

Cluff et al.

[11] Patent Number: 4,665,128
[45] Date of Patent: May 12, 1987

[54] FLEXIBLE COATING COMPOSITIONS

[75] Inventors: Stephen L. Cluff, Baton Rouge, La.; Clifford H. Strolle, Springfield, Pa.

[73] Assignee: E. I. Du Pont de Nemours and Company, Wilmington, Del.

[21] Appl. No.: 651,083

[22] Filed: Sep. 17, 1984

[51] Int. Cl.$^4$ ................................................ C08F 8/00
[52] U.S. Cl. .................................... 525/131; 525/123; 525/127
[58] Field of Search .................. 525/123, 127, 131

[56] References Cited

U.S. PATENT DOCUMENTS 4,143,091  3/1979  Chang et al. ...................... 525/131
4,404,324  9/1983  Fock et al. ......................... 525/123

FOREIGN PATENT DOCUMENTS 0043050  1/1982  Fed. Rep. of Germany ...... 525/123

Primary Examiner—John C. Bleutge
Assistant Examiner—A. L. Carrillo

[57] ABSTRACT

Blends of acrylic copolymer and polyester urethane provide resin suitable for use as enamel coatings which, when cured, exhibit both hardness and flexibility.

6 Claims, No Drawings

FLEXIBLE COATING COMPOSITIONS

BACKGROUND OF THE INVENTION

In recent years, the quantity of thermoplastic and elastomeric materials used in automobile manufacture has increased markedly. For example, such polymeric materials have been used increasing as exterior body components, and, with the installation of increasingly complex bumper systems, sight shields have been incorporated between the main body components and the bumpers. A concurrent need has arisen for enamel coatings which are compatible with the thermoplastic and elastomeric materials. Such coatings, in their finished state, should be hard, since hard coatings tend to stay cleaner, retain their gloss and resist scratching. At the same time, in the use of enamels on polymeric substrates, a flexibility is needed which typically has heretofore been provided only through a significant reduction in hardness.

SUMMARY OF THE INVENTION

The instant invention provides an improved polymeric system suitable for use in enamel coatings, which, in its cured state, exhibits a combination of hardness and flexibility which has heretofore not been obtainable with enamel systems.

Specifically, the instant invention provides a polymer blend consisting essentially of (a) about from 60 to 90% by weight of an acrylic copolymer containing copolymerized methacrylamide and prepared from complemental quantities of
  (1) about from 20 to 60 weight percent alkyl methacrylate in which the alkyl group contains from 1 to 18 carbon atoms
  (2) about from 65 to 20 weight percent alkyl acrylate wherein the alkyl group contains from 1 to 18 carbon atoms, and
  (3) about from 10 to 40 weight percent methacrylamide, and (b) about from 10 to 40 weight percent of at least one polyester urethane.

DETAILED DESCRIPTION OF THE INVENTION

The acrylic copolymer used in the present invention is prepared from at least three components, these being an alkyl methacrylate, an alkyl acrylate and methacrylamide.

The alkyl methacrylates which can be used in the preparation of the acrylic copolymers have alkyl groups of from 1–18 carbon atoms. These can include, for example, methyl methacrylate, butyl methacrylate, ethyl methacrylate, hydroxyethyl methacrylate, lauryl methacrylate, stearyl methacrylate, and hydroxypropyl methacrylate. Of these, methyl methacrylate has been found to impart excellent durability and is accordingly preferred.

Alkyl acrylates wherein the alkyl group has from 1–18 carbon atoms which can be used in the present invention include ethyl acrylate, butyl acrylate, 2-ethylhexylacrylate or hydroxyethyl acrylate. Of these, butyl acrylate has been found to impart excellent flexibility to the polymer and good weathering characteristics, and is accordingly preferred.

In addition to the alkyl methacrylate, alkyl acrylate and methacrylamide specified for the acrylic copolymers used in the present invention, it is preferred that the monomers used in the preparation of the acrylic copolymer further comprise about from 1 to 5 percent by weight of unsaturated organic acid of up to 5 carbon atoms which is polymerizable by free radical initiation. Such acids can include, for example, acrylic acid, methacrylic acid, itaconic acid, maleic acid, fumaric acid and crotonic acid.

To improve the gloss characteristics of the final enamel finish, up to about ⅛ of the alkyl methacrylate can be replaced by styrene. Vinyl toluene, vinyl acetate, dialkyl itaconic esters, and alkyl maleates and fumurates, acrylonitrile and methacrylonitrile can similarly be used to replace part of the alkyl methacrylate to modify various performance characteristics of the final coating, as will be evident to those skilled in the art.

The acrylic copolymers used in the present invention can be prepared by bringing together the monomers in an inert organic solvent in the presence of a free-radical forming initiator of the peroxide or azo type. Solvents which can be used in the reaction can include aromatic solvents, esters, ethers, and ketones, including, for example, benzene, toluene, xylene, butyl acetate, ethylene glycol monoethyl ether acetate, acetone, methyl isobutyl ketone, and methylethyl ketone. Initiators which can be used in the present invention, include benzoyl peroxide, lauroyl peroxide, ditertiary butyl peroxide, cumene hydroperoxide, and azoisobutyric acid dinitrile.

The polymerization of the acrylic copolymer is generally carried out at temperatures of about from 50° to 170° C. It has found to be particularly convenient to first heat a quantity of organic solvent to the reaction temperature, and then simultaneously introduce the monomeric reactants and a solution of the free-radical forming initiator. In the event that concentrations of methacrylamide of about from 15 to 30 weight percent are desired, it is often necessary to introduce the methacrylamide in a solution of solvent for that compound such as n-butanol. In this case, after substantial completion of the reaction of the basic monomeric components, a 40% solution of formaldehyde in n-butanol, together with a catalyst such as a dodecyl benzene sulfonic acid solution is added. The polymer solution is then concentrated by distillation, preferably with a packed column.

As indicated above, the alkyl methacrylate is generally present in a concentration of about from 20 to 60% by weight, the alkyl acrylate in a concentration of about from 65 to 20% by weight, and the methacrylamide present in a concentration of about from 10 to 40% by weight. The unsaturated organic acid, when used, is preferably present in a concentration of about from 1 to 5 percent by weight. In general, concentrations of about from 15 to 30 percent by weight of methacrylamide are preferred, since these concentrations result in increased functionality and crosslinking capability for the final polymer blend. Within the ranges specified, the alkyl methacrylate and alkyl acrylate components can be modified to provide a harder or softer final polymer coating. In general, the hardness of the final coating will increase with increasing concentrations of the methyl methacrylate and methacrylamide.

The second basic component of the present polymer blends is a polyesterurethane. Such polyester urethanes are typically prepared by the reaction of a diol and an isocyanate.

Diols which can be used include polycaprolactone diol, as well as a wide variety of hydroxyl terminated polyesters made from polybasic acids and polyols. Polybasic acids which can be used include aliphatic, cycloaliphatic, aromatic and/or heterocyclic acids and they can be substituted, e.g. by halogen atoms, and/or unsaturated. Representative examples include succinic acid, adipic acid, suberic acid; azelaic acid; sebacic acid, phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids such as oleic acid; which may be mixed with monomeric fatty acids; dimethyl terephthalate and bis-glycolterephthalate.

Polyhydric alcohols which can be used include ethylene glycol; propylene glycol-(1,2) and -(1,3); butylene glycol-(1,4) and -(1,3); hexanediol-(1,6); octanediol-(1,8); neopentyl glycol; cyclohexanedimethanol-(1,4-bis-hydroxymethylcyclohexane); 2-methyl-1,3-propanediol; glycerol; trimethylol-propane; hexanetriol-(1,2,6); butanetriol-(1,2,4); trimethylolethane; triethylene glycol; tetraethylene glycol; polyethylene glycol; dipropylene glycol; polypropylene glycol; dibutylene glycol and polybutylene glycol. The polyesters can also contain a proportion of carboxyl end groups. Polyester of lactones, e.g. Σ-caprolactam, or hydroxycarboxylic acids, e.g. ω-hydroxycaproic acid, can also be used.

The preparation of the OH-terminated polymers can be carried out in the presence of organic solvents which are commonly used in polyurethane coating compositions and include esters, ketones, halogenated hydrocarbons, alkanes, alkenes and arenes. Examples of these solvents are methylene chloride, trichloroethylene, toluene, xylene, butyl acetate, amyl acetate, isobutyl acetate, methyl isobutyl ketone, methoxybutyl acetate, cyclohexane, cyclohexanone, dichlorobenzene, diethyl ketone, diisobutyl ketone, dioxane, ethyl acetate, ethyl n-amyl ketone, ethyl n-butyl ketone, ethylene dichloride, ethylene glycol monobutyl ether acetate, ethylene glycol monoethyl ether acetate, ethylene glycol monomethyl ether acetate, 2-ethylhexyl acetate, glycol diacetate, heptane, hexane, isobutyl acetate, isobutyl isobutyrate, isooctane, isopropyl acetate, methyl acetate, methyl chloroform, methyl chloride, methyl ethyl ketone, methyl n-heptyl ketone, methyl isoamyl ketone, methyl n-propyl ketone, mineral spirits, monochlorobenzene, 2-nitropropane, orthene, orthodichlorobenzene, perchloroethylene, n-propyl acetate, tetrahydrofuran, tetrachloroethylene, 1,1,1-trichloroethane, trichlorofluoromethane and mixtures of these solvents.

The preferred solvents are toluene, xylene, butyl acetate, methyl isobutyl ketone, ethyl acetate, ethylene glycol monobutyl ether acetate, ethylene glycol monoethyl ether acetate, ethylene glycol monomethyl ether acetate, isobutyl isobutyrate, methyl ethyl ketone and mineral spirits.

The amount of solvent may vary within wide limits, but is generally maintained below about 80% by weight, preferably below about 50% by weight, based on the weight of the OH-terminated prepolymers.

The acids and polyols are charged to a reactor with a small amount of solvent, generally about 5% of the weight of acids and polyol. No esterification catalyst is necessary. The water of esterification can be removed by azeotropic distillation at temperatures of about from 160° C. to 245° C. The water removal is generally carried on until an acid number of less than 10 is reached.

The batch is reduced to the desired solids with an appropriate solvent.

Isocyanates which can be used in the preparation of the polyester-urethane include methylene bis(cyclohexyl isocyanate) isophorone di-isocyanate, hexylmethylene diisocyanate, trimethyl hexamethylene diisocyanate and toluene diisocyanate.

In the preparation of the polyester urethane, a slight molar excess of the diol is used in the reaction, preferably in combination with about from 0.05 to 0.15 moles of a source of carboxyl groups such as 2,2-bis(hydroxymethyl) propionic acid.

The basic components of the polyester urethane are brought together in a solvent such as ethylacetate, and xylene, together with a catalyst such as dibutyl tin dilaurate, and dibutyl tin oxide. The reaction is typically carried out at elevated temperatures of about from 100° to 150° C., a range of about from 120° to 130° C. having been found to be particularly satisfactory.

Particularly satisfactory polyesterurethanes are those prepared from the components described in U.S. Pat. No. 4,413,111, hereby incorporated by reference.

The acrylic copolymer and polyester urethane, in the polymer blend of the present invention, are present in quantities of about from 60 to 90 percent to weight of the acrylic copolymer and, complementally, about from 10 to 40 percent by weight of the polyester urethane. It has been found that less than about 60% of the acrylic copolymer fails to provide the desirable hardness in the present invention, while concentrations of the acrylic polymer in excess of 90% result in reduced flexibility.

The two basic components of the present polymer blend can be combined by simple blending techniques. In addition to the two basic polymeric components, the polymer blend can contain up to about 5% of conventional additives for enamel systems, including, for example, antioxidants, ultraviolet light stabilizers, and flow control agents. The polymer blends of the present invention can be used as flexible clear coating compositions, or, with the addition of about from 15 to 50 weight percent pigment, can be used as a colored enamel.

In the use of the present polymer blends, about from 0.3 to 6.0 percent, by weight of the resin blend, of catalyst is added to cure the polymer blend to its desired final state. Catalysts which can be used, for example, include p-toluene sulfonic acids, trifluoromethane sulfonic acid or triflic acid, and dodecyl benzene sulfonic acid. Of these, dodecyl benzene sulfonic acid has been found to be particularly satisfactory.

In the preparation of the polyester urethane, the ratios of the components will necessarily vary with the specific properties desired in the final product. However, using the components particularly preferred in the present invention, the polyester urethane will be prepared from about from 0.11 to 0.09 moles of 2,2-bis(hydroxymethyl) propionic acid, about from 0.54 to 0.46 moles of polycaprolactone diol, and about from 0.35 to 0.45 moles of methylene bis(cyclohexylisocyanate).

The polymer blends of the present invention can be applied to a wide variety of surfaces, including metals, thermoplastic and elastomeric polymeric materials. In a cured state, the polymers result in a coating which provides an unusual combination of hardness and flexibility. Accordingly, the polymer blends are particularly well suited for use as enamels in automobile finishing.

The present invention is further illustrated by the following specific example in which parts and percentages are by weight unless otherwise indicated.

EXAMPLE I

PART A—PREPARATION OF ACRYLIC COPOLYMER 400 parts of aromatic hydrocarbon solvent, consisting of a mixture of nine carbon-aromatic hydrocarbons which boil in the range of 150°–155° C., and commercially available from Exxon Corporation as Solvesso 100 solvent, was introduced into a reaction vessel and heated to a temperature of 110° C. A monomer solution and a catalyst solution were added to the reaction vessel simultaneously. The catalyst solution consisted of 40 parts by weight of a 75% tertiary butyl peroctoate solution and 100 parts of the same aromatic hydrocarbon solution previously added to the reaction vessel. The monomer solution contained 230 parts methyl methacrylate, 550 parts butyl acrylate, 20 parts acrylic acid, and a solution of 200 parts methacrylamide in 1000 parts n-butanol. The catalyst solution was added over a 6¼ hour period while the monomer solution was simultaneously added over a 6 hour period. The reaction mixture was held under reflux for an additional hour. Thereafter, 379 parts n-butyl Formcel (40% formaldehyde in n-butanol) and two parts of 65% dodecyl sulfonic acid solution were added to the reaction mixture, after which the temperature of the mixture was raised to 130° C. After 2 hours, 42 grams of water were removed, followed by the removal of 954 grams of n-butanol. The resulting resin remaining in the reaction had a yellow color and, on evaluation, exhibited the following characteristics:

TABLE I

| GPC Molecular Weight - | $M_n = 4400$ |
|---|---|
| % solids | — 55.0 |
| Mw | = 12.489 |
| Acid # | — 11.8 |
| polydispersity (d) | = 2.84 |
| Gardner-Holdt Viscosity | — X + ½ |
| Tg = | — 5° C. |

PART B—PREPARATION OF POLYESTER URETHANE 11.89 parts of 2,2-bis(hydroxymethyl)-propionic acid, 118.47 parts of ethyl acetate solvent, 485.20 parts polycaprolactone diol having a molecular weight of about 1000 and 0.12 parts butyl tin dilaurate catalyst were introduced into a reaction vessel and then heated to a temperature of 200° to 210° F. (93° to 99° C.). To this heated reaction mixture was added 105.85 parts of methylene bis(cyclohexylisocyanate) over a 20 minute period, maintaining the temperature of the reaction mixture at 200° to 210° F. (93° to 99° C.). After completion of the addition of the isocyanate, the temperature of the reaction mixture was maintained at this temperature range for 8 hours.

At the completion of the 8 hour period, 118.47 grams of xylene was added and the reaction mixture cooled to 140° F. and then filtered through a 10 micron filter. The resulting polymer was evaluated and found to exhibit the following characteristics:

TABLE II

| Resin Specs: | |
|---|---|
| Solids: | 71–73% |
| Gardner Holdt Viscosity: | $Z_1$-$Z_3$ |
| Hydroxyl Number: | 38 |
| Acid No.: | 7–10 |
| Residual Isocyanate: | .13% max on solids |
| GAL. WT.: | 8.40 lbs. |

PART C—PREPARATION OF POLYMER BLEND 80 parts of the acrylic resin prepared in section A and 20 parts of the polyester urethane prepared in section B were blended, together with 1.5 parts of dodecyl benzene sulfonic acid. The resulting blend was coated onto a substrate and evaluated for performance. The substrate was reaction injection molded urethane plastic. The coat was exhibited satisfactory gasoline resistance, excellent −20° F. flex, good knife scrape, good 96 hour humidity, satisfactory overbake flex, a hardness of 3 Knoop and 42% weight solids.

We claim:
1. A coating composition consisting essentially of
    (a) about from 60 to 90% by weight of an acrylic copolymer consisting of copolymerized methacrylamide and prepared from complemental quantities of
        (1) about from 20 to 60 weight percent methyl methacrylate,
        (2) about from 65 to 20 weight percent alkyl acrylate wherein the alkyl group contains from 1 to 18 carbon atoms, and
        (3) about from 15 to 30 weight percent methacrylamide, and
    (b) about from 10–40 weight percent of at least one polyester urethane.
2. A coating composition of claim 1 wherein the alkyl acrylate used in the preparation of the acrylic copolymer is butyl acrylate.
3. A coating composition of claim 1 wherein the acrylic copolymer comprises about 80% by weight of the polymer blend and the polyester urethane comprises about 20% by weight of the coating composition.
4. A coating composition of claim 1 wherein the polyester urethane is prepared from polycaprolactone diol and methylene bis(cyclohexyl isocyanate).
5. A coating composition of claim 1 further comprising about from 0.03 to 6.0 percent curing catalyst.
6. A coating composition of claim 5 wherein the curing catalyst is dodecylbenzene sulfonic acid.

\* \* \* \* \*